(12) United States Patent
Bueker et al.

(10) Patent No.: US 9,736,088 B1
(45) Date of Patent: Aug. 15, 2017

(54) STRUCTURED COMMUNICATION FRAMEWORK

(71) Applicant: PongPro LLC, New York, NY (US)

(72) Inventors: Craig Alan Bueker, New York, NY (US); Michael Graham McQuinn, Brooklyn, NY (US)

(73) Assignee: PongPro LLC, New York, NY (US)

( * ) Notice: Subject to any disclaimer, the term of this patent is extended or adjusted under 35 U.S.C. 154(b) by 442 days.

(21) Appl. No.: 14/267,079

(22) Filed: May 1, 2014

Related U.S. Application Data (60) Provisional application No. 61/877,873, filed on Sep. 13, 2013, provisional application No. 61/818,392, filed on May 1, 2013.

(51) Int. Cl.
*H04L 12/58* (2006.01)

(52) U.S. Cl.
CPC .................................. *H04L 51/02* (2013.01)

(58) Field of Classification Search
CPC ....................................................... H04L 51/02
USPC .......................................................... 709/206
See application file for complete search history.

(56) References Cited

U.S. PATENT DOCUMENTS

| | | | |
|---|---|---|---|
| 5,884,302 A * | 3/1999 | Ho | G09B 5/00 |
| 7,447,635 B1 * | 11/2008 | Konopka | G10L 15/22 704/231 |
| 8,346,563 B1 * | 1/2013 | Hjelm | G10L 15/1822 379/88.01 |
| 2004/0083092 A1 * | 4/2004 | Valles | G06F 17/2785 704/9 |
| 2006/0026256 A1 * | 2/2006 | Diddee | H04L 51/04 709/207 |
| 2007/0055656 A1 * | 3/2007 | Tunstall-Pedoe | G06F 17/30654 |
| 2010/0223543 A1 * | 9/2010 | Marston | G06F 17/243 715/224 |
| 2010/0324961 A1 * | 12/2010 | Singh | G06Q 30/016 705/304 |
| 2011/0228922 A1 * | 9/2011 | Dhara | H04L 12/1818 379/202.01 |
| 2012/0036145 A1 * | 2/2012 | Tunstall-Pedoe | G06F 17/30654 707/760 |
| 2013/0254677 A1 * | 9/2013 | Carroll | G06Q 10/107 715/752 |
| 2013/0275136 A1 * | 10/2013 | Czahor | G10L 15/22 704/257 |
| 2014/0101261 A1 * | 4/2014 | Wu | G06Q 10/107 709/206 |

(Continued)

*Primary Examiner* — Nicholas Taylor
*Assistant Examiner* — Chong G Kim
(74) *Attorney, Agent, or Firm* — Fenwick & West LLP (57) ABSTRACT

In a structured communication system, a message is received at a server from a communication application of a first client device. Based on content of the message, an unstructured portion of the message and a predefined set of allowable responses to the message are identified. The message is then outputted to a second client device. A response is received to the message from the second client device. The server determines whether response to the message complies with the predefined set of allowable responses to the message. Responsive to the response not complying, an invalid response message is sent to the second client device indicating that the response is not compliant. Responsive to the response complying, the response is sent to the first client device.

14 Claims, 8 Drawing Sheets

(56) References Cited

U.S. PATENT DOCUMENTS

2014/0280089 A1* 9/2014 Moxley .............. G06F 17/3053
                                                             707/723

* cited by examiner

STRUCTURED COMMUNICATION FRAMEWORK

CROSS-REFERENCE TO RELATED APPLICATIONS

This application claims the benefit of U.S. Provisional Application No. 61/877,873 filed on Sep. 13, 2013 and U.S. Provisional Application No. 61/818,392 filed on May 1, 2013, the contents of which are incorporated by reference herein.

BACKGROUND

Enterprises often rely on communication protocols such as email and short message service (SMS) to manage workflows and other business needs. These conventional communication protocols are based on natural language messages and responses, which often result in communication inefficiencies. For example, an employee may misinterpret a question from a supervisor as requiring a detailed response, when the supervisor is actually only interested in a "yes" or "no" answer. Furthermore, the reliance on natural language makes it difficult to automatically monitor and process communications for the purpose of workflow management.

SUMMARY

In a first embodiment, a method facilitates a structured communication. A server receives a message from a communication application of a first client device. Based on content of the message, an unstructured portion of the message and a predefined set of allowable responses to the message are identified. The message is outputted to a second client device. A response to the message is received from the second client device, and the server determines whether the response to the message complies with the predefined set of allowable responses to the message. Responsive to the response not complying, an invalid response notification is sent to the second client device indicating that the response is not compliant. Responsive to the response complying, the response is sent to the first client device.

In a second embodiment, a non-transitory computer-readable storage medium stores instructions for performing the computer-implemented method described above.

In a third embodiment, a system comprises a processor and a non-transitory computer-readable storage medium that stores instructions for performing the computer-implemented method described above.

The figures depict embodiments for purposes of illustration only. One skilled in the art will readily recognize from the following description that alternative embodiments of the structures and methods illustrated herein may be employed without departing from the principles described herein.

DETAILED DESCRIPTION

A communication protocol enforces a structured communication framework between two or more users operating respective client devices. When sending a message, a sender specifies a structured format that limits the possible allowed responses based on a set of response rules. The recipient may respond to the message according to the limited response rules set forth by the sender. The structured framework thereby improves communication efficiency because the sender is much more likely to get the type of response desired. Furthermore, the structured framework enables automatic parsing and processing of communications for internal workflow tracking or other purposes. The protocol furthermore enables automatic tracking of a state of the communication and clearly delineates which user is responsible for the next communication. This protocol is thereby able to coordinates complex interactions using a simple communication format.

In one embodiment, both the message and responses can be set forth directly in the body of a communication (such as an email or text message) to enable a sender to easily create structured communications without using a complicated interface. The interface for creating and responding to structured communication may comprise, for example, a standardized interface specifically designed for operation with the structured communication framework, or may leverage an existing interface such as, for example, an email application interface. In one example of a structured communication, a user may send a message in a simple form such as, "Alice, would you take out the trash? Yes|No." The structured communication system automatically parses the message to identify an unstructured portion of the message comprising natural language content (e.g., "Alice, would you take out the trash?"), and determines based on the natural language content and the message structure that "Yes" and "No" specify allowed responses. The structured communication system then automatically ensures that a response to the message follows one of the allowed responses. Additional details regarding the communication protocol and communication structures are described below.

Figure 1:
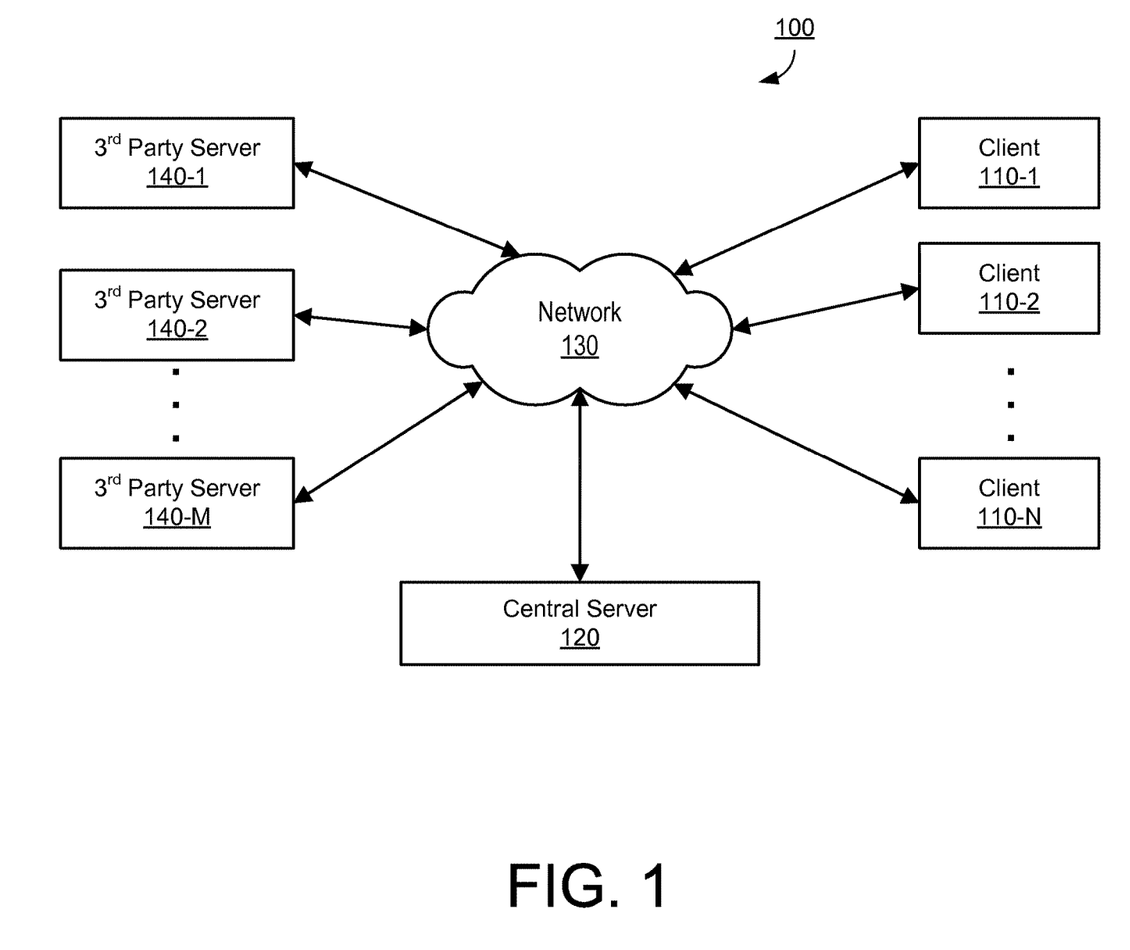
FIG. 1 is a block diagram illustrating an embodiment of a computing environment for a structured communication system.

FIG. 1 is a high-level block diagram of a structured communication system 100 according to one embodiment. The structure communication system 100 includes a central server 120, one or more third party servers (e.g., third party servers 140-1, 140-2, . . . , 140-M) and a plurality of clients 120 (e.g., clients 120-1, 120-2, . . . , 120-N) coupled by a network 130. Alternative embodiments may include additional or different components.

A client 110 (e.g., clients 110-1, 110-2, . . . , 110-N) can be any type of computing device that is capable of supporting a communications interface to the central server 120 and/or one or more third party servers 140. Suitable devices may include, but are not limited to, personal computers, mobile computers (e.g., notebook computers), personal digital assistants (PDAs), smartphones, tablets, mobile phones, gaming consoles, and network-enabled viewing devices (e.g., set-top boxes, televisions, and receivers). The clients 150 each comprise one or more processors and one or more non-transitory computer-readable storage mediums (among other components) that enable the clients 150 to execute various user interface tools used to send and receive communications according to the structured communication framework and to manage user accounts. For example, in one embodiment, a client 110 executes a web browser application that provides a web-based user interface that enables the client 110 to interact with the central server 120 or a third party server 140 via the network 130 using a web-based interface. Alternatively, locally installed applications (or "apps") may provide a user interface that enables the client 110 to interact with the central server 120 or third party server 140.

The user interface of the client 110 enables a user to initiate or respond to a message within the structured communication framework. When initiating a message, the user specifies a recipient of the message, the content of the message, and one or more rules that place limitations on the allowed possible responses to the message. When responding to a received message, the original recipient specifies content of a response that is in accordance with the rules set forth by the sender in the original message. In one embodiment, the user interface furthermore enables a user to specify one or more actions to be performed such as, for example, archiving previous communications, canceling a pending message, or modifying the rules for allowed responses to a pending message. Furthermore, in one embodiment, the user interface enables a user to create or manage various aspects of a user account associated with the structured communication system 100. The user account stores information identifying the user together with various communication preferences of the user as will be described in further detail below.

Structured communications can be sent to and from clients using different communication applications and protocols. For example, in one embodiment, communications are sent and received on the client 110 using an email application that communicates with the central server 120 using a native email communication protocol (e.g., simple mail transfer protocol (SMTP)). In another embodiment, communications are sent and received on the client 110 using a short message service (SMS) application that communicates with the central server 120 using a native SMS protocol. Using these traditional communication applications, the user can sends an email or SMS to a designated email address or phone number associated with the central server 120. Alternatively, a plug-in can be installed to operate with an existing email or SMS application. For example, in one embodiment, the sender can instead specify the recipient's email address or phone number in the "To:" field of the email and the plug-in instead causes the email or SMS application to route the email or SMS to the central server 110. In yet another embodiment, communications are sent and received on the client via a web interface (accessed via a web browser) or an application interface (e.g., a mobile application interface). For example, messages could be sent using applications such as WHATSAPP MESSENGER, APPLE'S IMESSAGE, or other applications that use custom communication protocols. In these embodiments, a local application or plug-in on the client device 110 intercepts messages sent via the messaging application interface (via the custom protocol) and routes the message to the central server 110 for processing.

The network 130 enables communications among the entities connected to it. The network 130 may use standard communications technologies and/or protocols such as Ethernet, Wifi, worldwide interoperability for microwave access (WiMAX), 3G, 4G, etc. Furthermore, the network 130 can operate using encryption technologies such as, for example, secure sockets layer (SSL), transport layer security (TLS), virtual private networks (VPNs), etc. In other embodiments, the network 130 or a portion thereof may uses custom and/or dedicated data communications technologies instead of, or in addition to, the ones described above.

The central server 120 generally facilities communication in the structured communication framework between two or more clients 110. The central server 120 receives communications from a sending client 110 according to one of a plurality of possible communication sources (e.g., email, SMS, a mobile application, a web-based interface, etc.). The central server 120 processes the communications to ensure that the communications are valid (e.g., meets a set of rules associated with the structured communication framework). The central server 120 then determines an appropriate recipient for the communication and transmits the communication to the recipient client according to one or more communication frameworks (e.g., email, SMS, a mobile application, a web-based interface, etc.). The central server 120 may furthermore log communications and track the state of communications. Additionally, the central server 120 may process user-requested actions related to the communications such as archiving or deleting communications.

The central server 120 is generally implemented as one or more computing devices (e.g., one or more servers) having one or more processors and one or more computer-readable storage mediums storing computer-executable program instructions. When executed, the program instructions are loaded to a memory and executed by the one or more processors. Execution of the program instructions enables the central server 120 to carry out the functions and processes described herein.

The third-party servers 140 operate in conjunction with the central server 120 to facilitate communication between the clients 110 and the central server 120. Examples of third-party servers 140 that may be used with the structured communication system 100 include, for example, email servers, short message system (SMS) servers, extensible messaging and presence protocol (XMPP) messenger/chat servers, or other servers implementing custom communication protocols. Such third party servers 140 enable third party developers to integrate custom applications and/or communication protocols with the structured communication system 110. For example, in one embodiment, a third-party server 140 receives a communication from a client and forwards the communication to the central server 120 for processing. Optionally, the third-party server 140 may receive the communication in a custom format specific to a third party application and translate the communication to a standardized format used by the central server 120. Furthermore, the third-party server 140 may receive outgoing communications from the central server 120 and forward the communication to the recipient client 110. The third-party server 140 may additionally translate the communications to the custom format compatible with the third party application.

Figure 2:
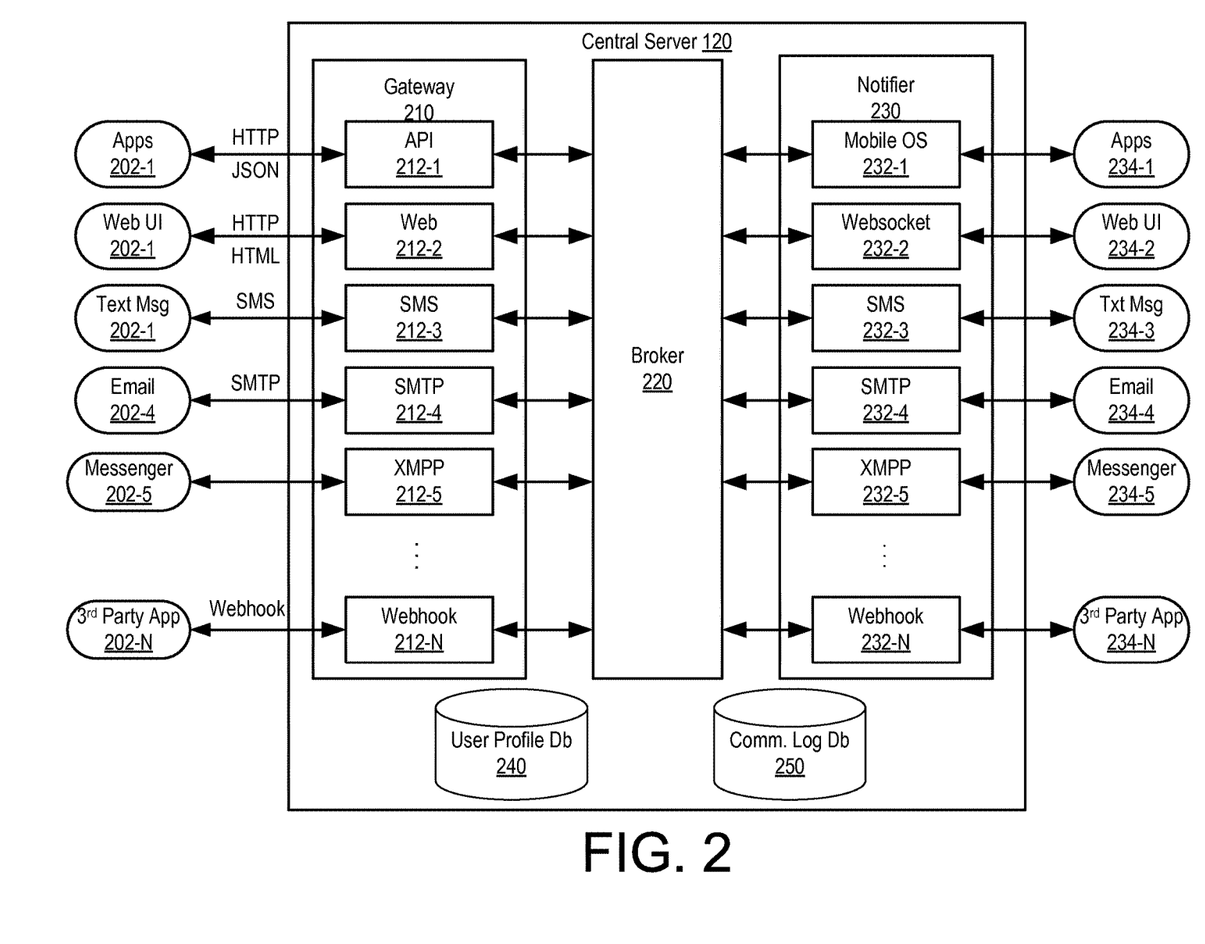
FIG. 2 is a block diagram illustrating an embodiment of a central server in a structured communication system.

FIG. 2 illustrates an example embodiment of the central server 120. The central server 120 comprises a gateway 210, a broker 220, a notifier 230, a user profile database 240, and a communication log database 250. Alternative embodiments may include additional or different components.

The gateway 210 comprises one or more transport-specific gateway modules 212 (e.g., an application programming interface (API) gateway module 212-1, a web gateway module 212-2, an SMS gateway module 212-3, an SMTP gateway module 212-4, a XMPP gateway module 212-5, a webhook gateway module 212-N, etc.). In general, each transport-specific gateway is responsible for communications to and from the client 110 using a particular transport.

Each transport-specific gateway module 212 is configured to receive and process communications from different sources and translate the communications to a standardized format that is independent of the source. For example, the API gateway module 212-1 is configured to receive and translate communications that are generated by a locally installed client application 202-1 (e.g., a mobile app) using, for example, HyperText Transfer Protocol (HTTP) and JavaScript Object Notation (JSON), or other suitable protocols. The web gateway module 212-2 is configured to receive and translate communications that are generated from a web-based user interface 202-2 and may be formatted according to HTTP, HyperText Markup Language (HTML), or other suitable format. The SMS gateway module 212-3 is configured to receive and translate SMS communications (e.g., text messages 202-3). The SMTP gateway module 212-4 is configured to receive and translate email communications 202-4 based on the SMTP. The XMPP gateway module 212-5 is configured to receive and translate messenger or chat communications 202-5 based on XMPP. The webhook gateway module 212-N is configured to receive and translate communications obtained via webhooks from $3^{rd}$ party applications 202-N. The webhook gateway module 212-N enables third party applications 202-N communicate with the structured communication system 100. For example, in one embodiment, the webhook gateway module 212-N monitors a known uniform resource identifier (URI) that receives HTTP POST/PUT requests when communications are sent via the third party application 202-N. By enabling compatibility between the broker 220 and third party applications 202-N, the structured communication system 100 enables third party developers to develop custom applications having customized user interfaces and customized communication protocols that can integrated seamlessly with the structured communication system 100.

In one embodiment, the gateway 210 may perform natural language processing on received communications to automatically parse communications that are received in natural language format. For example, the gateway 210 may use natural language processing to determine if the incoming communication is a new message, a response to a previous message, or a requested action. The gateway 210 may furthermore parse the message using natural language processing to identify, for example, the message sender, the message recipient, the message content, or response rules. Response rules may indicate, for example, whether a freeform type of response is allowed or whether a structured response format will be enforced in which the response must be selected from one of a specified set of allowed responses. In the case that a structured response is specified, the gateway 210 furthermore parses the message to specifically determine each of the possible allowed responses (e.g., "yes" or "no"). In one embodiment, natural language processing is used for communications received via open form communication systems such as email and SMS. Communications from other sources may not necessarily require natural language processing because the associated user interfaces may force users to provide the communication in a more structured form. For example, communications receiving from a web-based user interface or application interface may be obtained via a fillable form that forces the sender to identify the various communication fields, such as the sender, recipient, message content, response type (e.g., freeform or structured), allowed responses, etc.

The gateway 210 furthermore determines if the received communication is complete. For example, in one embodiment, the gateway 210 determines that the communication is complete if the message unambiguously specifies all of the information required by the communication framework. If the communication is not complete, the gateway 210 may automatically send a response to the sending client 110 requesting additional information. For example, if a sender specifies "Alice" as the recipient but there are two or more "Alices" in the sender's address book, the gateway 210 may reply back to the sender to ask "which Alice is the recipient?" If a message is received in a natural language form, the gateway may automatically reply if clarification is needed to parse the message for processing. For example, if the gateway 210 cannot determine whether a freeform or structured response is allowed, the gateway 210 may ask the sender to specify. In the case of a structured response, the gateway 210 may ask the sender to specify each of the possible allowed responses if the delineation is not expressly provided and cannot be inferred from the natural language content of the message. In one embodiment, this automatic response is sent according to the same communication transport in which the message was received. If the gateway 210 deems a received communication complete, the gateway 210 passes the message to the broker 220 in the standardized format.

The broker 220 brokers communications between the gateway 210 and the notifier 230. The broker analyzes messages received from the gateway 210 in the standardized format and determines if the message is valid. For example, in one embodiment, the broker 220 determines that both the sender and intended recipient of the communication have registered accounts with the structured communication system 100. The broker 220 may furthermore process the content of the message to ensure that the message adheres to a set of predetermined communication rules. For example, if the communication is a response to a message specifying a particular response structure, the broker 220 ensures that the response adheres to the specified structure. Here, if the response is to a message specifying a set of allowable responses (as opposed to a freeform response), the broker 220 verifies that the response matches one of the allowed responses. If the message is valid, the broker logs the message and passes the message to the notifier 230. Otherwise, the broker 220 sends an invalid message notification to the originating client 110 (e.g., via the notifier 230 or gateway 210). In one embodiment, the broker 210 also processes actions requested by users. For example, the broker may process requests to archive communications, delete communications, update allowed responses for a pending communication, update a user preference, etc.

The notifier 230 notifies recipients of new communications or responses to previous communications. The notifier 230 receives communication from the broker 126 in the standardized format and converts the communication to a format appropriate for transmission to a recipient client 110. In one embodiment, the notifier 230 comprises a plurality of transport-specific notification modules 232 (e.g., a mobile operating system (OS) notification module 232-1, a websocket notification module 232-2, an SMS notification module 232-3, an SMTP notification module 232-4, an XMPP notification module 232-5, a webhook notification module 232-N, etc.). Each transport-specific notification module 232 receives the communications in the standardized format and translates the communications to a transport-specific format depending on the destination. For example, the mobile OS notification module 232-1 formats communications intended for use with a locally installed client application 234-1 (e.g., a mobile app) according to HTTP, JSON format, or other suitable format. The websocket notification module 232-2 formats communications intended for use with a web-based user interface 234-2 according to HTTP, HTML or other format. The SMS notification module 232-3 formats communications intended for use with a text messaging application 234-3 according to SMS format. The SMTP notification module 232-4 formats communications intended for use with an email application 234-4 according to SMTP format. The XMPP notification module 232-5 formats communications intended for use with a messenger or chat application 234-5 that operates based on XMPP. The webhook notification module 232-N formats communications using a webhook that can be monitored and processed by $3^{rd}$ party applications 234-N. For example, the webhook notification module 232-N posts request to a known uniform resource identifier (URI) that can be monitored by a third party application 234-N. The third party application 234-N can take some automatic action based on a received communication. For example, the application can update a calendar, update workflow tracking data, or automatically respond to a message. In the case of a workflow tracking application, the webhook notification module 232-N or application parses the content of the message to identify a workflow action item associated with the message, identifies a status of a workflow action item based on the content of the message, and automatically provides input to a workflow tracking application to add, modify, or delete an entry associated with the workflow action item based on status. In this way, workflow status can be automatically tracked based on the communications. In one embodiment, if a third party application 234-N is used to create a new message for a user, the third party application may set a webhook that gets a POST request when the user responds to the message.

Other communication formats may also be used depending on the type of application intended to receive the communication. The notifier 230 can furthermore automatically initiate actions based on communications. For example, if a user responds "No" to an invitation-type of a message, the notifier 230 could send a message removing the event from the user's calendar.

In one embodiment, the broker 220 broadcasts messages to each individual transport-specific notification module 232, and each transport-specific notification module 232 then determines whether or not to send the communication based on user preferences of the recipient. For example, if a user specifies a preference to receive communications only by email 234-4 and via a web user interface 234-2, then only transport-specific notifier modules 232-4, 232-2 send the communication, while the other modules discard the message. Thus, the broker 220 need not know which transport-specific notification modules 232 are present in the notifier 230. This enables flexible scalability of the central server 120 because transport-specific notification modules 232 can be added or removed without modifying the broker 220. In an alternative embodiment, the broker 220 determines the recipient's communication preferences and sends the message only to the appropriate transport-specific notification modules 232 corresponding to the recipient's preferences.

The user profile database 240 stores profile information for a plurality of users of the structured communication system 100. The user profile database 240 may store, for example, identifiers for one or more clients 110 associated with a particular user, communication preferences of the user, a contact list associated with the user, or other information associated with the user. The communication log database 250 stores logs of communications between users of the structured communication system 100 as will be described below.

Figure 3:
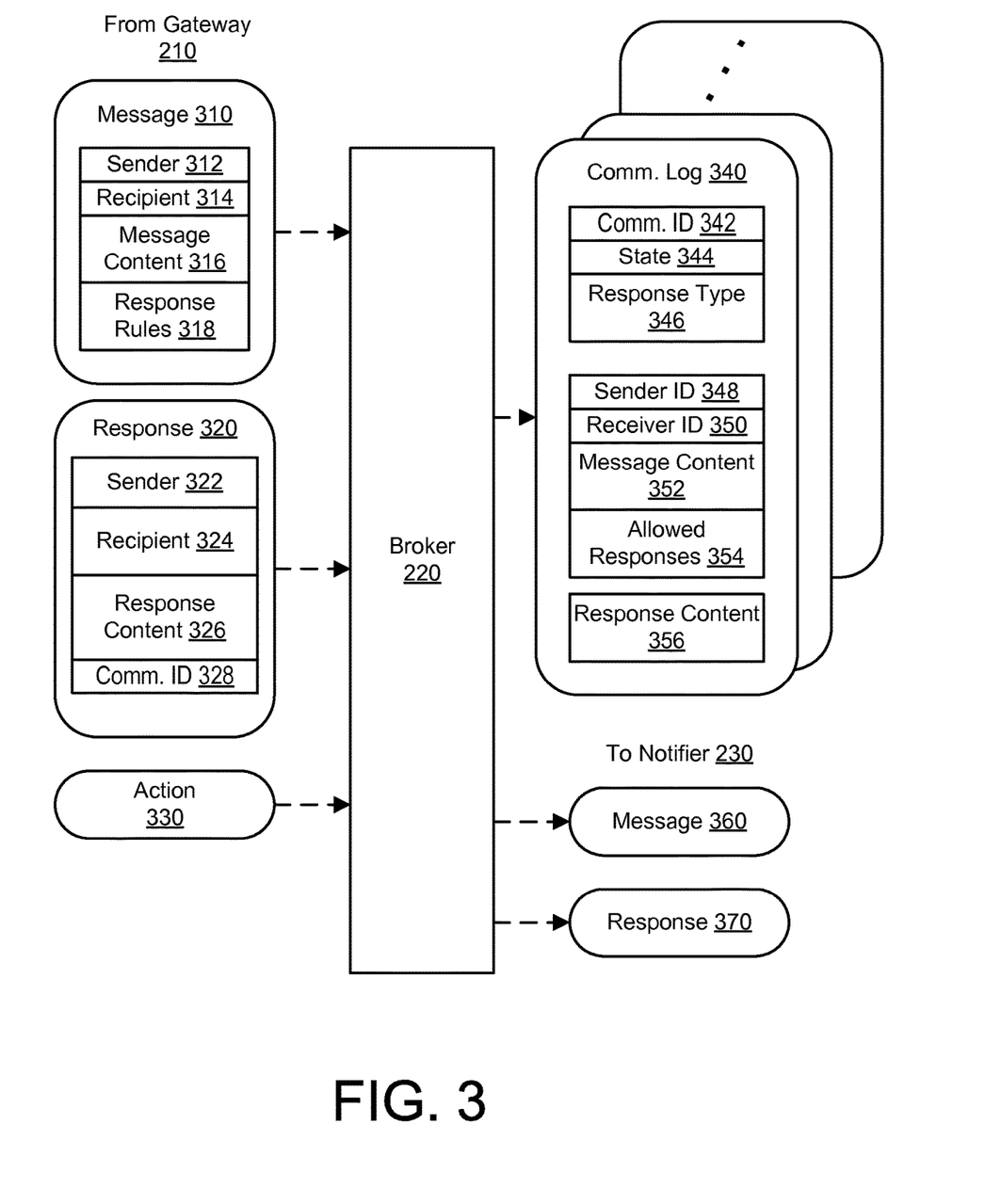
FIG. 3 is a diagram illustrating input and output data structures to and from a broker in a structured communication system.

FIG. 3 illustrates example data structures to and from the broker 220 in the standardized format. In one embodiment, a communication to the broker 220 can be categorized as one of three types of communications: a message 310, a response 320, and an action 330. Each of these message types are formatted by the gateway 210 to conform with the standard format used by the broker 220. In one embodiment, a message 310 comprises a sender data field 312 identifying the sender of the message, a recipient data field 314 identifying the intended recipient of the message, a message content data field 316 including the natural language content of the message, and response rules data fields 318 indicating one or more allowed responses or other response rules for responding to the message. A response 320 comprises a sender data field 322 identifying the sender of the response, a recipient data field 324 identifying a recipient of the response, a response content field 326 indicating the content of the response, and a communication identifier 328 identifying a previous communication associated with the response 320. An action 330 specifies an action to be performed by the broker 220 such as, for example, archiving a previous communication, deleting a communication, modifying allowed responses to a pending communication, etc.

For each new message, the broker 220 generates a new communication log entry 340 that will be associated with the communication. In addition to storing the data fields associated with the message 310 (e.g., a sender data field 348, a receiver data field 360, a message content data field 352, and a response rules data field 354), the broker 220 generates a communication identifier 342 that will be associated with a related message 310 and response 320. The broker 220 furthermore determines a state of the communication and stores the state information to a state field 344. For example, in one embodiment, the state is either "active" (a message 310 has been sent without a response 320) or completed (a response 320 has been received to the message 310). In one embodiment, the communication log entry 340 also stores a response type field 346 specifying the type of allowed responses, which can be determined from the response rules 318. For example, in one embodiment, the response type field 346 can specify a "closed-ended" type of response or an "open-ended" (or "freeform") response. The broker 220 sets the response type field 346 to "closed-ended" when a finite set of allowed responses are specified by the sender (e.g., "yes" or "no") or can be implicitly determined. The broker 220 sets the response type field 346 to "open-ended" when the sender does not limit the allowed responses to a specific list, but instead allows the recipient to respond in an open-ended format.

In one embodiment, the broker 220 furthermore outputs the message 360 or response 370 to the notifier 230. Each notifier than processes the message 360 or response 370 according to the transport-specific protocols. The message 360 and response 370 may have the same fields as the message 310 and response 320 received from the gateway 210 for a consistent communication framework.

Figure 4:
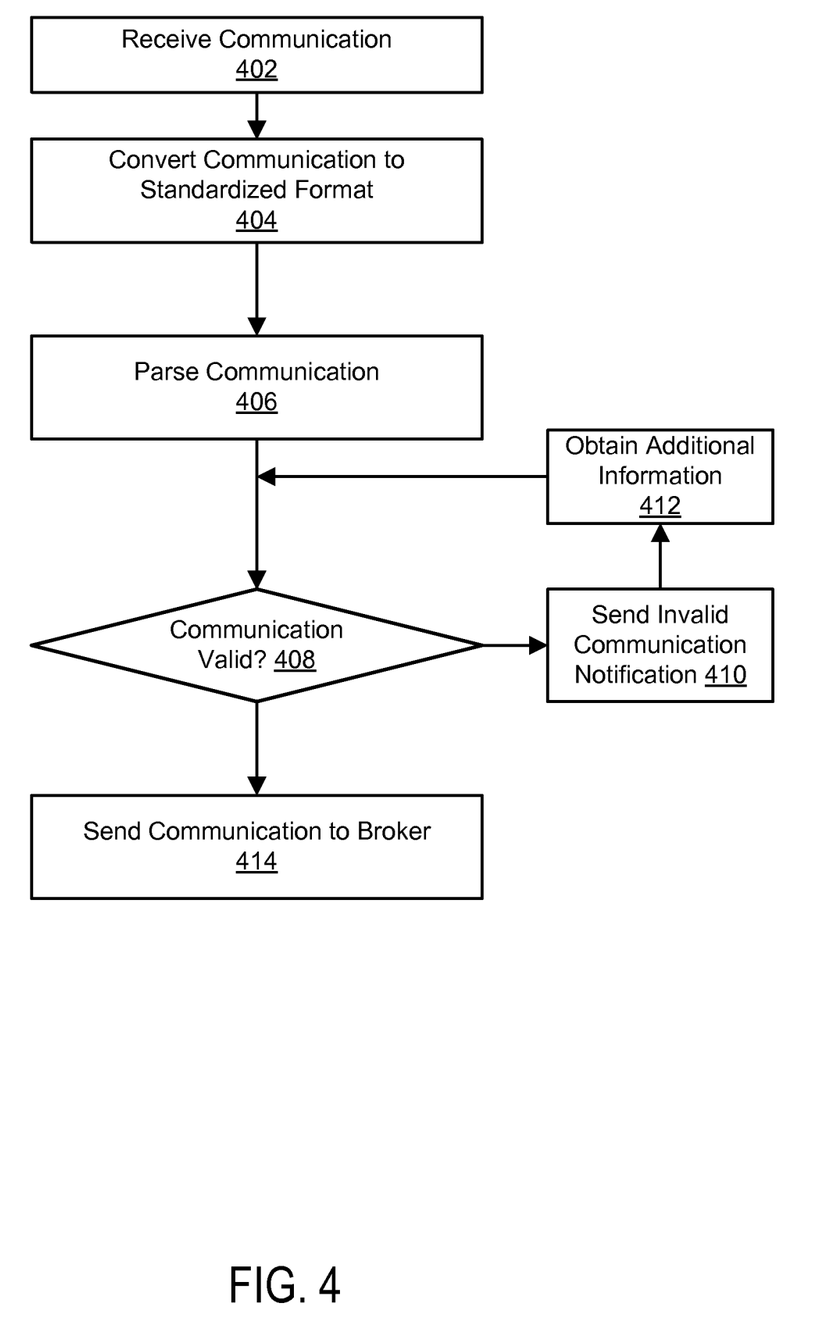
FIG. 4 is a flowchart illustrating an embodiment of a process performed by a gateway for processing a received communication in a structured communication system.

FIG. 4 illustrates an embodiment of a process performed by the gateway 210 for processing a received communications. The gateway 210 receives 402 a communication in a native format specific to an originating application. The communication may comprise a message 310, a response 320, or an action 330. The communication may comprise natural language content and/or may include metadata (e.g., field codes) indicating various where various components are present in the communication. For example, if the communication is sent via a web form, different parts of the message may be inserted by the user in different parts of the form, and the web application then expressly labels each part as corresponding to the sender 312, recipient 314, message content, 316, or response rules 318. In a response 320, different components of the response 320 may be expressly labeled as corresponding to the sender 322, recipient 324, response content 326, and communication ID 328. Alternatively, the communication may be entirely or partly in natural language form in which the specific components of the communication are not expressly identified. The gateway 210 converts 404 the communication from the native format to the standard format used by the broker 220 by decoding the communication from its native protocol. The gateway 210 furthermore parses 406 the communication to identify the type of communication (e.g., a new message 310, a response 320, or a user-requested action 330), and to identify the various data fields associated with each type of communication corresponding to different parts of a message, response, or action. If the communication is a new message 310, the gateway 210 can identify a sender 312, recipient 314, message content 316 (e.g., unstructured content), one or more responses rules 318 (e.g., structured content), or other portions of a communication that may be required by the structured communication system 100. Similarly, if the communication is a response 320 to a prior message, the gateway can identify the sender 322, recipient 324, response content 326, and communication identifier 328. An example of a process for parsing the communication is described in further detail below with respect to FIG. 5. The gateway 210 determines 408 if the communication is valid by determining whether the communication type and any required fields can be unambiguously identified. If the communication is not valid, the gateway 210 sends 410 an invalid communication notification. The invalid communication notification may include a request for additional information to resolve any ambiguity in the communication. In one embodiment, the invalid communication notification specifies the ambiguity in the received communication and requests information to resolve the ambiguity. For example if the gateway 210 cannot determine the type of communication, the notification message may request that the sender identify the type of communication (e.g., "Please response with message, response, or action to indicate the type of communication"). If any of the fields associated with the communication type cannot be unambiguously determined, the notification message may request this information (e.g., "Please list the allowed responses separated by a '|' symbol"). In one embodiment, the gateway 210 can obtain 412 additional information from the sender in response to the invalid communication notification. For example, the sender can respond with the specific information requested and the process then loops back to step 408. If the gateway 210 determines that the communication is valid in step 408, the converted communication is sent 414 to the broker 220.

Figure 5:
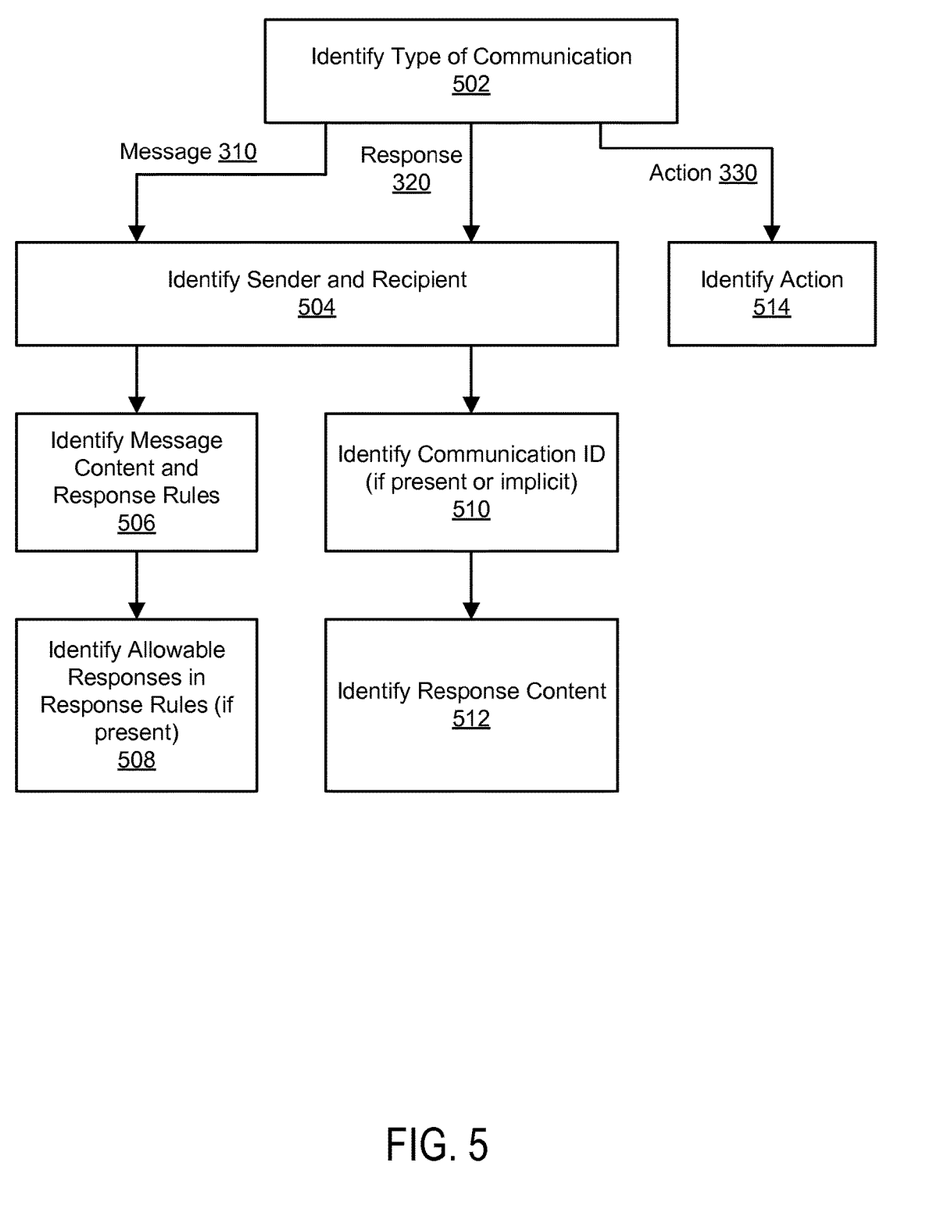
FIG. 5 is a flowchart illustrating an embodiment of a process performed by a gateway for parsing received communications in a structured communication system.

FIG. 5 illustrates an embodiment of process for parsing a communication into its components. The gateway 210 identifies 502 the type of communication (e.g., whether the communication is a new message 310, a response 320 to an active communication, or an action 330). In some communication formats, the type of communication is expressly identified in the communication. For example, if the communication is sent via a web form or mobile application, the web form or mobile application may require that the sender expressly indicate the type of communication (e.g., using a drop down box) and this indication may be included in metadata (e.g., in a header) sent with the communication. Alternatively, the type of communication may be inferred from natural language content. For example, in one embodiment, the presence of a question mark "?" indicates that the communication is a new message. Furthermore, the presence of certain known command keywords (e.g., "delete," "archive," etc.) indicate that the communication is an action 330. In some embodiments, certain characters may indicate that the communication is a response. For example, the presence of "re:" in a subject line of an email communication typically indicates a response. In other embodiments, the identification of the sender and recipient may be used to determine whether a communication is a new message or a response. For example, if there are no active communications between Alice and Bob, then a new communication from Alice to Bob is inferred to be a new message. On the other hand, if a message from Bob to Alice is still active (no response has been identified yet), then a communication from Alice to Bob is inferred to be a response to the prior message. In other embodiments, additional natural language processing may be performed to determine the type of communication. Furthermore, if the type of communication is ambiguous, the gateway 210 may send a reply requesting additional information (e.g., "is this communication a response to Bob's message relating to taxes? Yes|No").

If the communication is a message 310 or response 320, the gateway 210 identifies 504 a sender of the communication and an intended recipient (if present) for the communication. For most communication protocols such as email, SMS, messaging, etc. address information for the sender and recipient are explicitly specified in communication protocol and can be extracted from, for example, a header or other data field embedded with the communication. For example, for SMS communication the gateway 210 can determine the sender and recipient based on the sending telephone and destination telephone number embedded in the message protocol. Similarly, for email communication, the gateway 210 can determine the sender and recipient based on the sending and destination email address embedded in the email protocol. If the sender uses a web interface to send the message, the sender may be determined automatically based on, for example, login information provided by the sender to access the web interface and the recipient may be identified based on a selected recipient in the web form. The address, phone number, or other identifier may be applied directly to the sender field 312 and recipient field 314 of the message 310, or a user associated with the address or other identifier may be determined by performing a lookup in the user profile database 240.

If address information for the sender and recipient are not expressly specified in a data field of the communication protocol (e.g., if the message is sent to a general address for the central server 120 rather than to an address associated with a specific recipient), this information may be extracted from the natural language content of the message, if present. For example, in the message "Alice, would you take out the trash? Yes|No," the gateway 210 determines that "Alice" is the intended recipient based on the grammatical structure of the sentence or by recognizing that "Alice" is a name.

In another embodiment, multiple recipients can be inferred from a single communication. For example, in the message, "Bob and Alice, are you free tomorrow at noon to meet?" "Bob" and "Alice" are each intended recipients. Here, the gateway 210 creates two messages, one to Bob and one to Alice.

In some cases, no recipient is identified, which may indicate that the communication is an action. An action may be identified, for example, if no recipient is indicated and the communication includes certain keywords matching known actions as will be discussed below.

If the communication is a new message 310, the message content 316 and response rules 318 are identified 506. The response rules 318, if present, may indicate the type of response requested (e.g., a freeform response or a selection of a set of specified allowed responses). The response rules 318 may be explicit or implicit. If explicit response rules 318 are present, they may be expressly specified as metadata included with the communication. For example, a message sent via a web form or application may enforce that the sender explicitly identifies the type of response requested and specifically identify any allowed responses. Alternatively, the response rules 318 may be explicitly provided in a text-based communication that conforms to a particular format. For example, in one embodiment, the gateway 210 identifies a special end-of-content character (e.g., a question mark "?") that indicates the end of the message content and separates the message content from a set of allowed responses. The gateway 210 then designates content before the end-of-content character as the message content 316 and designate content after the end-of content character as the response rules 318.

If the response rules include a set of allowable responses, the gateway 210 furthermore identifies 508 the allowable responses. In one embodiment, the gateway 210 identifies a special character (e.g., a pipe "|") in the response rules portion of the message that acts a delimiter between different possible allowed responses in the response rules 318. The gateway 210 then parses the content to designate a phrase before the special character as a first allowed response, a phrase after the special character as a second allowed response, and so on, if additional special characters are present.

As one particular example, in the message "Alice, would you take out the trash? Yes|No," the gateway 210 determines that "Alice" is the intended recipient based on the grammatical structure of the sentence or by recognizing that "Alice" is a name. Furthermore, the gateway 210 determines that "would you take out the trash?" is the content of the message by recognizing that the "?" is an end-of-content character indicating the end of the message content. The gateway 210 furthermore determines that the characters before the end-of-content character comprise an unstructured portion of the message including natural language content and the characters following the "?" represent allowed responses, with each allowed response separated by the "|" character. Thus, the allowed responses are "Yes" and "No." In another embodiment, more than two allowed responses may be specified. For example, in the message, "Alice, when is our next meeting? Today|Tomorrow|Next Week," Alice is determined to be the intended recipient, "When is our next meeting?" is the message content, and "today" "tomorrow" and "next week" are all allowed responses.

If the gateway 210 determines that the predefined allowed responses are not expressly stated, the gateway 210 may determine that the allowed responses are implicit. In one embodiment, when no predefined allowed responses are expressly stated, a grammatical analysis is performed to determine if the message is open-ended or closed-ended. If the message is closed-ended, the set of allowable responses can be determined implicitly based on the grammatical analysis. For example, in the message "Alice, would you take out the trash?" a grammatical analysis can determine that "yes" and "no" are the allowed responses, even though these are not explicitly stated. Furthermore, in the message "Alice, is our meeting today or tomorrow?" a grammatical analysis can determine that the allowed response occur before and after the "or" in the message and therefore "today" and "tomorrow" are the allowed responses. If no specific allowed responses can be identified, either implicitly or explicitly, the gateway 210 may determine that a freeform response is requested, or that the communication is a response or action.

In the case where the communication is identified as a response 320, the communication identifier 328 is identified 510 to determine which message the response is associated with. The communication identifier 328 may either be explicitly included in the communication or may inferred from the content of the communication. For example, if only a single active communication exists from Alice to Bob, then the gateway 210 may determine that a subsequent communication from Bob to Alice is associated with the same communication identifier 328. If multiple active communications exist, the gateway 210 may ask the sender to specify the message to be associated with the response. Alternatively, the gateway 210 may attempt to resolve the ambiguity by determining if the response conforms to the allowable responses for only one of the active messages. In other embodiments, the communication identifier 328 a topic analysis can also be performed to match a topic of the message with a topic of the response. The gateway 210 furthermore identifies the response content 512.

If the communication is an action 330, the gateway 210 identifies the action. In one embodiment, the gateway 210 stores a set of established actions that can be executed by the broker 220. When a communication is received, the gateway 210 determines if the communication references an action in the establish set of possible actions. For example, the gateway 210 may look for certain known action keywords in the communication and recognize the communication as an action when a keyword match is found. For example, the user could send a communication, "delete last message" or "archive last 10 messages." The terms "delete" and "archive" can be recognized as actions, thus enabling the gateway 210 to properly process the communications. If an action is recognized, the action is sent to the broker 220 which executes the desired action.

Other examples of natural language processing in the context of a structured communication system will be apparent to those of ordinary skill in the art. In other embodiments, where applications or web-forms are used to send communications, the gateway 210 may not necessarily need to perform any natural language processing to determine the type of message or the message contents. Rather, in some embodiments, the user or application determines the type of communication and this information is provided together with the communication contents.

Furthermore, in different embodiments, the steps of FIG. 5 may be performed in a different order or steps may be omitted. For example, in one embodiment, the type of communication is not necessarily expressly identified prior to identifying at least some of the components of the communication. Rather, in some embodiments, the type of communication may be identified only once a sufficient number of components have been identified to unambiguously characterize the communication type.

Figure 6:
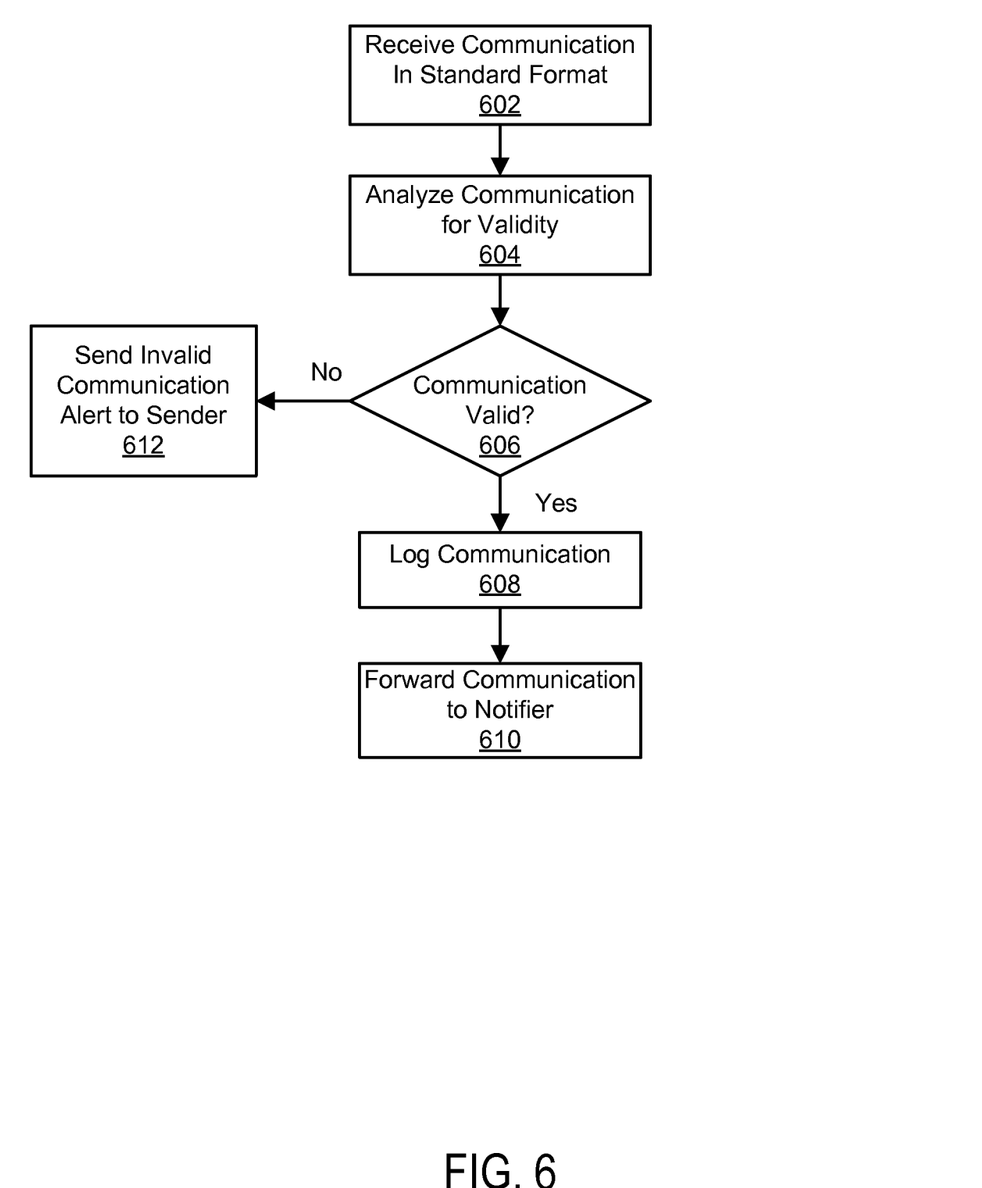
FIG. 6 is a flowchart illustrating an embodiment of a process performed by a broker for processing a received communication in a structured communication system.
Figure 7:
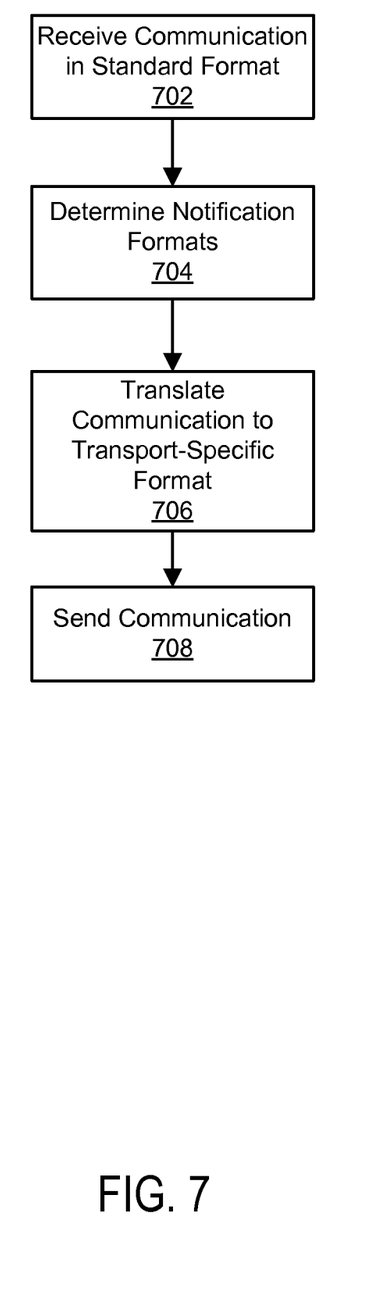
FIG. 7 is a flowchart illustrating an embodiment of a process performed by a notifier for processing a received communication in a structured communication system.

FIG. 6 illustrates an embodiment of a process for brokering communications between clients 110 in the structured communication system 100. The broker 220 receives 602 a communication from the gateway 210 in the standard communication format. The broker 220 analyzes 604 the communication for validity and determines 606 if the communication is valid. In the case of a response, the broker 220 determines a logged message having a communication identifier 342 matching the response 320, and if allowed responses 354 are specified, compares the response content 326 to the allowed responses 354, and determines that the response 320 is valid if it matches one of the allowed responses 354. In the case of an action 330, the broker 220 determines if the action can be performed. For example, in a "delete" action, the broker 220 determines that the action is valid if the referenced communication for deletion is present in the communication log 340. A message may also be deemed invalid if the recipient cannot be located. In other examples, additional communication rules may assess the validity of communications between more than two individuals. For example in one embodiment, a response to a first message is not valid until a response to a different message (possibly from a different user) is completed. For example, a response by Bob to Alice may not be deemed valid until Bob first responds to a different message from Charlie. In another example, a response by Bob to Alice may not be deemed valid until Charlie first responds to a different message from Bob. The broker 220 tracks the state of these messages so that it is clear to each user who is responsible for the next communication. If the communication is not valid, the broker 220 causes an invalid message alert to be sent back to the sender. If the communication is valid, the broker 220 logs 608 the message. In one embodiment, whenever a new message is received, the broker 220 generates a new communication identifier 342 for communication log entry 340, and sets the state field 344 of the communication to "active." When a response to an active communication is received and the response complies with the response rules, the broker 220 logs the response using the same communication identifier 342 as the corresponding message and sets the state field 344 to "completed." Tracking the communication state in this manner enables a third-party application to easily query the central server 120 to determine the status of a communication. For example, a workflow tracking application can determine if a communication is open or closed, and use this information track a related action item. The broker 220 then forwards 610 valid communications to the notifier 230. FIG. 7 illustrates an embodiment of a process for notifying a client 110 of a received communication. The process may be performed by the notifier 230. The notifier 230 receives 702 a communication from the broker 220 in the standard format. The notifier 230 determines 704 which notification format(s) to use to send the communication. In one embodiment, the notification format is based on a desired delivery mechanism of the recipient which may be specified in a user profile of the recipient. The notifier 230 translates 706 the communication from the standard format used by the broker 220 to one or more transport-specific communication formats using the appropriate transport-specific notifier modules 232. The message is then sent 708 according to the one or more selected formats.

Figure 8:
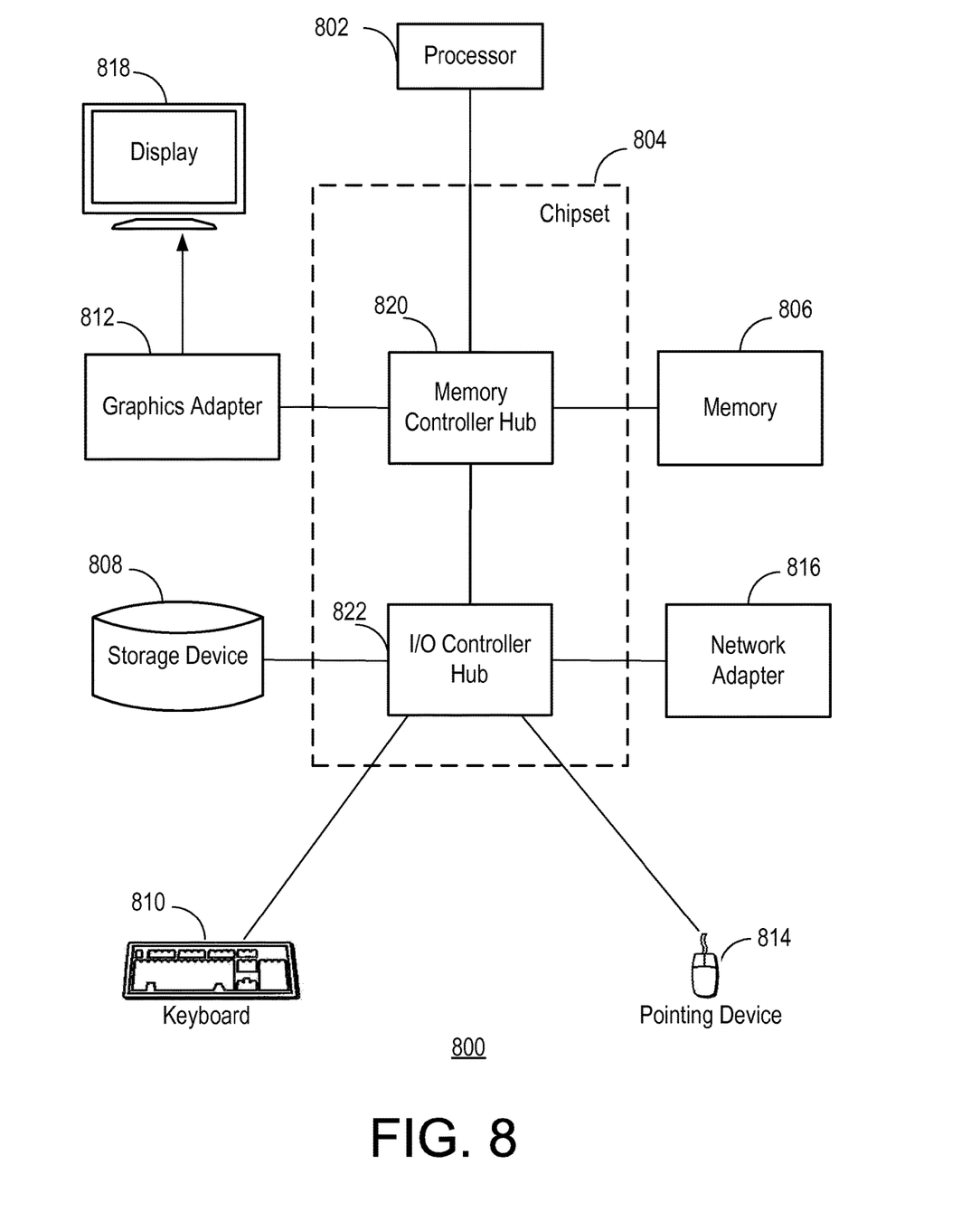
FIG. 8 is a block diagram illustrating an embodiment of a computer system for use with the structured communication system.

FIG. 8 is a high-level block diagram illustrating an example of a computer 800 for use as a client 110, central server 120, or third party server 140 implementing the communication framework described above. Illustrated are at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display device 818 is coupled to the graphics adapter 812. A storage device 808, keyboard 810, pointing device 814, and network adapter 816 are coupled to the I/O controller hub 822. Other embodiments of the computer 800 have different architectures. For example, the memory 806 is directly coupled to the processor 802 in some embodiments.

The types of computers 800 used by the entities of FIG. 8 can vary depending upon the embodiment and the processing power used by the entity. For example, a client 110 that is a mobile device may have limited processing power, a small display 818, and might lack a pointing device 814. The central server 110 or third party servers 140 in contrast, may comprise multiple blade servers working together to provide the functionality described herein, and may lack a pointing device 814, keyboard 810, graphics adapter 812, and display 818.

The storage device 808 is a non-transitory computer-readable storage medium such as a hard drive, disk drive, or a solid-state memory device. The memory 806 holds instructions and data used by the processor 802. The pointing device 814 is a mouse, track ball, touchpad, touchscreen, or other type of pointing device, and is used in combination with the keyboard 810 to input data into the computer system 800. The graphics adapter 812 displays images and other information on the display device 818. The network adapter 816 couples the computer system 800 to the network 830. Some embodiments of the computer 800 have different and/or other components than those shown in FIG. 8.

The computer 800 is adapted to execute computer program modules or applications for providing functionality described herein. As used herein, the term "module" or "application" refers to computer program instructions and other logic used to provide the specified functionality. Thus, a module or application can be implemented in hardware, firmware, and/or software. In one embodiment, program modules or applications formed of executable computer program instructions are stored on the storage device 808, loaded into the memory 806, and executed by the processor 802.

The above description is included to illustrate operation of the embodiments and does not limit the scope of the invention. From the above, many variations will be apparent to one skilled in the relevant art that would yet be encompassed by the scope of the invention.

The invention claimed is:

1. A method for facilitating a structured communication, the method comprising:
   receiving at a server via a computer network, a message from a communication application of a first client device, the message comprising a first sequence of text characters;
   performing a character analysis of the first sequence of text characters of the message to automatically separate the first sequence of text characters into a first subset of characters corresponding to an unstructured portion of the message and a second subset of characters corresponding to a predefined set of allowable responses to the message, wherein performing the character analysis comprises:

identifying one or more end-of-message characters in the first sequence of text characters;

identifying a first portion of the message before the end-of-message character as the first subset of the first sequence of text characters corresponding to the unstructured portion;

identifying a second portion of the message after the end-of-message character as the second subset of the first sequence of text characters corresponding to the predefined set of allowable responses;

identifying a delimiter character in the second subset of the first sequence of text characters; and determining the predefined set of allowable responses as a first allowed response corresponding to a first group of characters in the second subset before the delimiter character and a second allowed response corresponding to a second group of characters in the second subset after the delimiter character;

outputting the message to a second client device via the computer network;

receiving at the server via the computer network, a response to the message from the second client device, the response comprising a second sequence of text characters;

determining whether the response to the message complies with the predefined set of allowable responses to the message by comparing the second sequence of text characters to the second subset of the first sequence of text characters;

responsive to the response not complying, sending an invalid response notification to the second client device via the computer network indicating that the response is not compliant; and responsive to the response complying, sending the response to the first client device via the computer network.

2. The method of claim 1, wherein determining whether the response to the message complies comprises:

comparing content of the response to each of the predefined set of allowed responses;

determining that the response is compliant if the content of the response matches one of the predefined set of allowed responses; and determining that the response is not compliant if the content of the response does not match any of the predefined set of allowed responses.

3. The method of claim 1, further comprising:

receiving a second message;

determining that the second message lacks an express indicator that a second predefined set of allowable responses are expressly stated in the second message;

performing a grammatical analysis of natural language content of the second message to determine if the second message is open-ended or closed-ended; and responsive to determining that the second message is closed-ended, determining the second predefined set of allowable responses implicitly based on the grammatical analysis.

4. The method of claim 1, further comprising:

storing an association between the message and a communication identifier and setting a communication state field associated with the communication identifier to an active communication state;

storing an association between the response and the communication identifier;

responsive to the response complying with the predefined set of allowable responses, setting the communication state field associated with the communication identifier to a completed communication state;

receiving a query for a status of the message from a workflow tracking application; and responsive to the query, returning an indication of the communication state field.

5. The method of claim 1, wherein the message is received in a first transport-specific format associated with the communication application, the method further comprising:

converting the message from the first transport-specific format to a standardized format;

determining a desired delivery mechanism of the message to the second client device based on a stored profile of a recipient associated with the second client device; and converting the message from the standardized format to a second transport-specific format associated with the desired delivery mechanism of the recipient.

6. A non-transitory computer-readable storage medium storing instructions for facilitating a structured communication, the instructions when executed by a processor causing the processor to perform steps including:

receiving at a server via a computer network, a message from a communication application of a first client device, the message comprising a first sequence of text characters;

performing a character analysis of the first sequence of text characters of the message to automatically separate the first sequence of text characters into a first subset of characters corresponding to an unstructured portion of the message and a second subset of characters corresponding to a predefined set of allowable responses to the message, wherein performing the character analysis comprises:

identifying one or more end-of-message characters in the first sequence of text characters;

identifying a first portion of the message before the end-of-message character as the first subset of the first sequence of text characters corresponding to the unstructured portion;

identifying a second portion of the message after the end-of-message character as the second subset of the first sequence of text characters corresponding to the predefined set of allowable responses;

identifying a delimiter character in the second subset of the first sequence of text characters; and determining the predefined set of allowable responses as a first allowed response corresponding to a first group of characters in the second subset before the delimiter character and a second allowed response corresponding to a second group of characters in the second subset after the delimiter character;

outputting the message to a second client device via the computer network;

receiving at the server via the computer network, a response to the message from the second client device, the response comprising a second sequence of text characters;

determining whether the response to the message complies with the predefined set of allowable responses to the message by comparing the second sequence of text characters to the second subset of the first sequence of text characters;

responsive to the response not complying, sending an invalid response notification to the second client device via the computer network indicating that the response is not compliant; and responsive to the response complying, sending the response to the first client device via the computer network.

7. The non-transitory computer-readable storage medium of claim 6, wherein determining whether the response to the message complies comprises:

comparing content of the response to each of the predefined set of allowed responses;

determining that the response is compliant if the content of the response matches one of the predefined set of allowed responses; and determining that the response is not compliant if the content of the response does not match any of the predefined set of allowed responses.

8. The non-transitory computer-readable storage medium of claim 6, wherein the instructions when executed by the processor further cause the processor to perform steps including:

receiving a second message;

determining that the second message lacks an express indicator that a second predefined set of allowable responses are expressly stated in the second message;

performing a grammatical analysis of natural language content of the second message to determine if the second message is open-ended or closed-ended; and responsive to determining that the second message is closed-ended, determining the second predefined set of allowable responses implicitly based on the grammatical analysis.

9. The non-transitory computer-readable storage medium of claim 6, further comprising:

storing an association between the message and a communication identifier and setting a communication state field associated with the communication identifier to an active communication state;

storing an association between the response and the communication identifier;

responsive to the response complying with the predefined set of allowable responses, setting the communication state field associated with the communication identifier to a completed communication state;

receiving a query for a status of the message from a workflow tracking application; and responsive to the query, returning an indication of the communication state field.

10. The non-transitory computer-readable storage medium of claim 6, wherein the message is received in a first transport-specific format associated with the communication application, wherein the instructions when executed further cause the processor to perform steps including:

converting the message from the first transport-specific format to a standardized format;

determining a desired delivery mechanism of the message to the second client device based on a stored profile of a recipient associated with the second client device; and converting the message from the standardized format to a second transport-specific format associated with the desired delivery mechanism of the recipient.

11. A system for facilitating a structured communication, the system comprising:

a processor; and a non-transitory computer-readable storage medium storing instructions, the instructions when executed by the processor causing the processor to perform steps including:

receiving at a server via a computer network, a message from a communication application of a first client device, the message comprising a first sequence of text characters;

performing a character analysis of the first sequence of text characters of the message to automatically separate the first sequence of text characters into a first subset of characters corresponding to an unstructured portion of the message and a second subset of characters corresponding to a predefined set of allowable responses to the message, wherein performing the character analysis comprises:

identifying one or more end-of-message characters in the first sequence of text characters;

identifying a first portion of the message before the end-of-message character as the first subset of the first sequence of text characters corresponding to the unstructured portion;

identifying a second portion of the message after the end-of-message character as the second subset of the first sequence of text characters corresponding to the predefined set of allowable responses;

identifying a delimiter character in the second subset of the first sequence of text characters; and determining the predefined set of allowable responses as a first allowed response corresponding to a first group of characters in the second subset before the delimiter character and a second allowed response corresponding to a second group of characters in the second subset after the delimiter character;

outputting the message to a second client device via the computer network;

receiving at the server via the computer network, a response to the message from the second client device, the response comprising a second sequence of text characters;

determining whether the response to the message complies with the predefined set of allowable responses to the message by comparing the second sequence of text characters to the second subset of the first sequence of text characters;

responsive to the response not complying, sending an invalid response notification to the second client device via the computer network indicating that the response is not compliant; and responsive to the response complying, sending the response to the first client device via the computer network.

12. The system of claim 11, wherein determining whether the response to the message complies comprises:

comparing content of the response to each of the predefined set of allowed responses;

determining that the response is compliant if the content of the response matches one of the predefined set of allowed responses; and determining that the response is not compliant if the content of the response does not match any of the predefined set of allowed responses.

13. The system of claim 11, wherein the instructions when executed by the processor further cause the processor to perform steps including:

receiving a second message;

determining that the second message lacks an express indicator that a second predefined set of allowable responses are expressly stated in the second message;

performing a grammatical analysis of natural language content of the second message to determine if the second message is open-ended or closed-ended; and responsive to determining that the second message is closed-ended, determining the second predefined set of allowable responses implicitly based on the grammatical analysis.

14. The system of claim 11, further comprising:

storing an association between the message and a communication identifier and setting a communication state field associated with the communication identifier to an active communication state;

storing an association between the response and the communication identifier;

responsive to the response complying with the predefined set of allowable responses, setting the communication state field associated with the communication identifier to a completed communication state;

receiving a query for a status of the message from a workflow tracking application; and responsive to the query, returning an indication of the communication state field.

\* \* \* \* \*